Sept. 21, 1971 C. T. LEWIS 3,606,976

BRAKE FOR TAPE REEL

Filed July 10, 1969 2 Sheets-Sheet 1

CLARENCE T. LEWIS
*INVENTOR*

*BY*

*BUCKHORN, BLORE, KLARQUIST & SPARKMAN*
*ATTORNEYS*

BRAKE FOR TAPE REEL

Filed July 10, 1969 2 Sheets-Sheet 2

CLARENCE T. LEWIS
*INVENTOR*

*BY*
*BUCKHORN, BLORE, KLARQUIST & SPARKMAN*
*ATTORNEYS*

United States Patent Office 3,606,976
Patented Sept. 21, 1971

3,606,976
BRAKE FOR TAPE REEL

Clarence T. Lewis, Portland, Oreg., assignor to Data Pacific Corporation, Portland, Oreg.

Filed July 10, 1969, Ser. No. 840,802
Int. Cl. B65h *59/38, 63/02;* G11b *15/32*
U.S. Cl. 242—190 10 Claims

ABSTRACT OF THE DISCLOSURE

A brake for a tape reel includes a stationary brake shoe disc adjacent the tape reel wherein the brake shoe disc is provided with spring-mounted tabs for normally urging the brake shoe disc against the reel. An annular electromagnet is mounted in juxtaposition with the tape reel on the opposite side of the brake shoe disc therefrom and is employed for moving the brake shoe disc away from the reel.

BACKGROUND OF THE INVENTION

In winding information bearing tape such as punched paper tape or magnetic tape as used by a computer it is frequently necessary to accelerate and decelerate the tape very rapidly. Because of the inability to start and stop a tape reel and motor substantially instantaneously, variable length tape loops are frequently employed between the tape reel and a tape reading station. However, in order to avoid too long a tape loop, it is still of advantage to stop and start a tape reel with a minimum amount of delay. A motor may be energized for rapid acceleration, but deceleration frequently depends on a mechanical brake. Usual mechanical brakes for motors tend to be cumbersome, noisy, and slow acting.

SUMMARY OF THE INVENTION

According to the present invention, a tape reel is provided with a braking mechanism which is adapted to stop a reel with a minimum amount of delay. A stationary brake shoe disc comparable in size to the tape reel is mounted adjacent the tape reel, and spring means normally urge the brake shoe disc toward the tape reel for braking the same. An annular electromagnet is disposed in juxtaposition with the tape reel near the periphery of the tape reel but on the opposite side of the brake shoe disc from the tape reel. The electromagnet is energized for withdrawing the brake shoe disc from contact with the tape reel, for releasing the same, e.g. when the reel is to be rapidly accelerated by a drive motor.

A tape reel as hereinafter described includes a disc-like side surface or member forming a part of the reel, such reel being of the type described and claimed in the copending application of William C. Neal, Ser. No. 772,758, filed Nov. 1, 1968, for "Expandible Reel," and assigned to the assignee of the present invention. However, it is understood that other reels may be substituted therefor, and if such reel does not have a disc-like side member or side surface member appropriate for braking action, it is understood such a disc-like member may be joined to such reel for rotation therewith.

It is accordingly an object of the present invention to provide an improved brake means for a tape reel having improved braking action and minimized inertia allowing rapid engagement and disengagement of such brake means.

It is another object of the present invention to provide an improved brake means for a tape reel which brake means is substantially noiseless in operation.

It is another object of the present invention to provide an improved brake means for a tape reel which is simple, economical, and compact in construction.

It is a further object of the present invention to provide an improved brake means for a tape reel which may be formed substantially integrally with the motor means for the tape reel.

It is another object of the present invention to provide an improved circuit for accelerating and decelerating information bearing tape reels.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
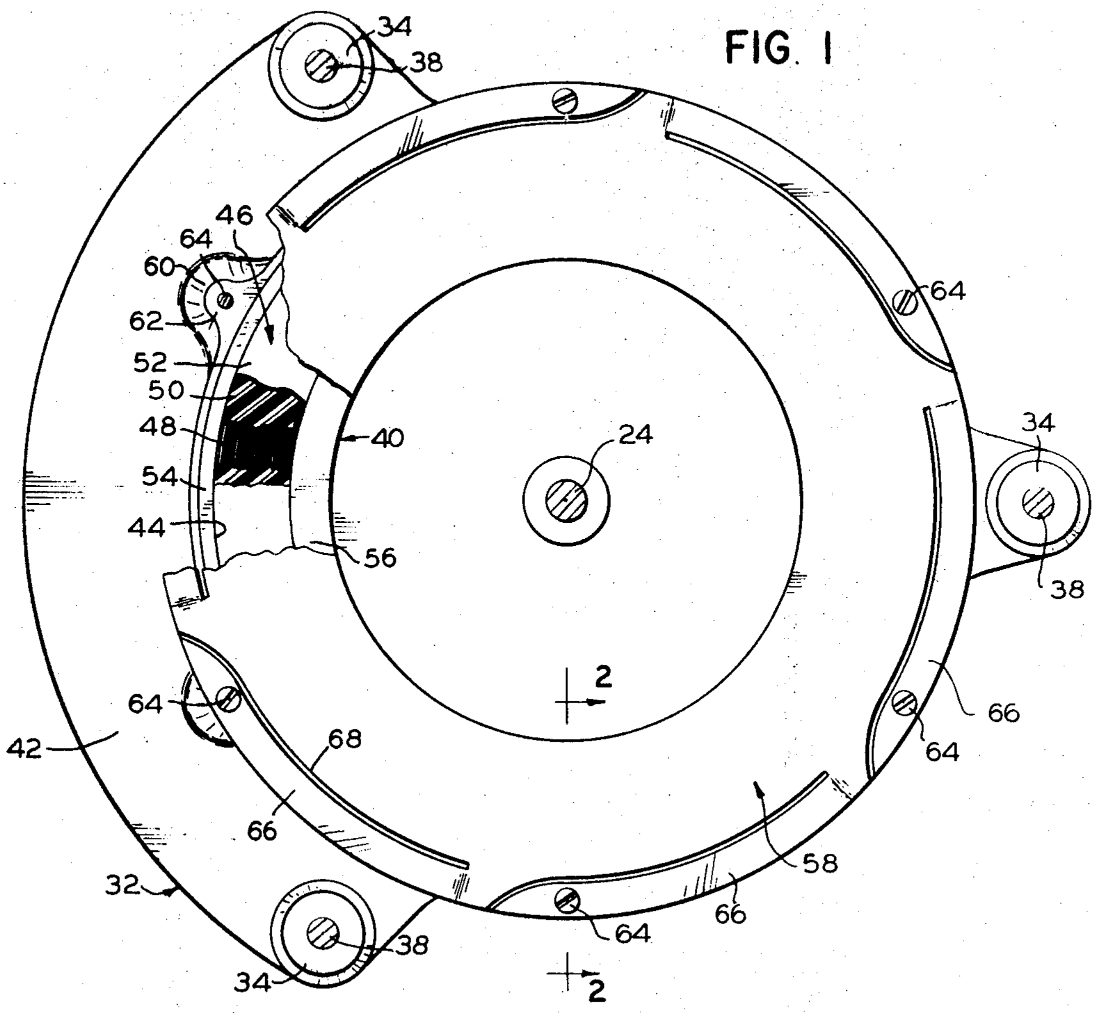
FIG. 1 is a plan view of a brake means, according to the present invention, for a tape reel with the tape reel itself not being shown in this view.
Figure 2:
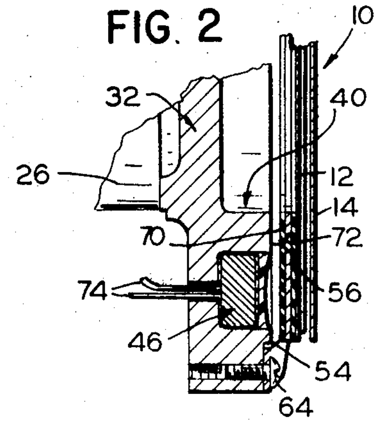
FIG. 2 is a cross section taken at location 2—2 in FIG. 1 illustrating the brake means in engaged condition, and further including a tape reel.
Figure 3:
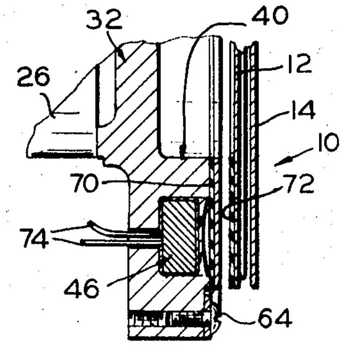
FIG. 3 is a similar cross section also taken at the location of 2—2 in FIG. 1, wherein the brake is shown disengaged.

Referring to the drawings, and particularly FIGS. 1 through 4, the brake means according to the present invention is employed for stopping or braking a reel generally indicated at 10, suitably having the form of the reel described in the aforementioned Neal application, Ser. No. 772,758. This reel includes a rear disc-like member 12 and a front disc-like member 14 wherein the front disc-like member is provided with caming slots (not shown) through which mandrel pins 16 extend. A punched paper taper or the like indicated at 18 is wound around these mandrel pins, with the mandrel pins being radially adjustable by means for knob 20.

The disc-like member 14 is secured to hub 22 while rear disc-like member 12 is mounted upon motor shaft 24 extending from motor 26 and journaled in bearings 28. With knob 20 tilted upwardly, hub 22 and member 14 are rotatable with respect to member 12 for positioning mandrel pins 16. However, for the position shown of knob 20, the members 12 and 14 are substantially locked together, and pins 16 are located a predetermined distance from hub 22. Glass door or partition 30 prevents the tape from moving off the pins to the right.

Motor 26 is mounted upon a mounting bracket 32 formed of magnetic material, that is material that is magnetizable when a magnetic field is applied. Bracket 32 is provided with lugs 34 which secure the bracket 32 to a panel 36 employing bolts 38. Reel 10 is positioned in general alignment with an aperture 122 in panel 36.

According to the present invention, bracket 32 includes an annular electromagnet 40 positioned outwardly (to the right) from face 42 of bracket 32. This electromagnet 40 is provided with an annular groove 44 in which is mounted a coil 46 comprising conductors 48 wrapped with insulating material 50 and embedded in plastic resin 52. The level of the coil and resin 52 is undercut below the outer surface of the electromagnet, leaving annular pole faces 54 and 56 equidistant from and parallel to face 42.

A flat annular brake shoe disc 58 is mounted upon bosses 60 disposed around the outer periphery of magnet 40 and having surfaces 62 parallel with the surfaces of pole faces 54 and 56 but slightly toward face 42 therefrom. Brake shoe disc 58 is formed of a magnetizable material such as sheet steel. Screws 64 secure the ends of spring tabs 66 to surfaces 62 of bosses 60, these spring tabs comprising cut-out portions of brake shoe disc 58. Spring tabs 66 are bent at an angle between screws 64 and the face of brake shoe disc 58 so as to urge the face of brake shoe disc 58 against disc member 12 of the tape reel. It is noted that since spring tabs 66 are joined to bosses 60 below the surface of pole faces 54 and 56, and since brake shoe disc 58 is positioned thereby above the surface of pole faces 54 and 56, then the inner portions of brake shoe disc 58 never reach the level of surfaces 62. Thus, there is no danger of interference with brake shoe operation along edges 68 where tabs 66 have been severed from brake shoe disc 58.

Brake shoe disc 58, inside spring tab 66, is provided on its inner surface with a thin neoprene coating 70 to provide cushioning and prevent unnecessary noise. The underside of member 12 is provided with a neoprene coating 72 which acts as a brake lining material. Other materials suitable for these purposes may be substituted for neoprene. When electromagnet 40 is energized via leads 74, disc 58 is rapidly attracted toward electromagnet 40 for closing the air gap between pole faces 54 and 56 and the rear of brake shoe disc 58. The neoprene coating 70 prevents a harsh snap when the brake shoe disc 58 is drawn toward pole faces 54 and 56. When the brake shoe disc 58 is attracted away from member 12, the disc is free to turn as motor 26 is energized. On the other hand, when electromagnet 40 is not energized, the brake shoe disc 58 normally presses against neoprene coating 72 thereby holding the reel 10 stationary.

The placement of neoprene coating 72 on member 12 instead of on brake shoe disc 58 allows the disc 58 to have less weight. In general, brake shoe disc 58 is light weight, and has low inertia, and may thus respond in either direction quite rapidly to energization or deenergization of electromagnet 40. No linkages are employed between a magnetic solenoid or the like and the brake surface, and brake mechanism backlash is thereby substantially eliminated. The gap between coating 70 and pole faces 54 and 56 is suitably about five-thousandths of an inch when the reel is braked. Therefore, the travel of brake shoe disc 58 is very short when it is energized or deenergized. Also, since the brake shoe disc and the electromagnet are near the outer periphery of the disc-like member 12, these members being substantially circumferentially adjacent one another, the braking moment is maximized. As a result of these factors, operation of this simply constructed brake is very rapid and results in almost immediate stopping of reel 10 when electromagnet 40 is deenergized. Reel braking is substantially faster than experienced employing conventional motor brakes.

Members 12 and 14 of reel 10 are desirably formed of aluminum which has several advantages. First, the material is light and allows more rapid acceleration and deceleration of the reel. Furthermore, aluminum is highly conductive and rapidly dissipates heat present in coating 72. Thirdly, since the reel is nonmagnetic, it is not attracted when electromagnet 40 is energized.

Figures 4, 5, 6:
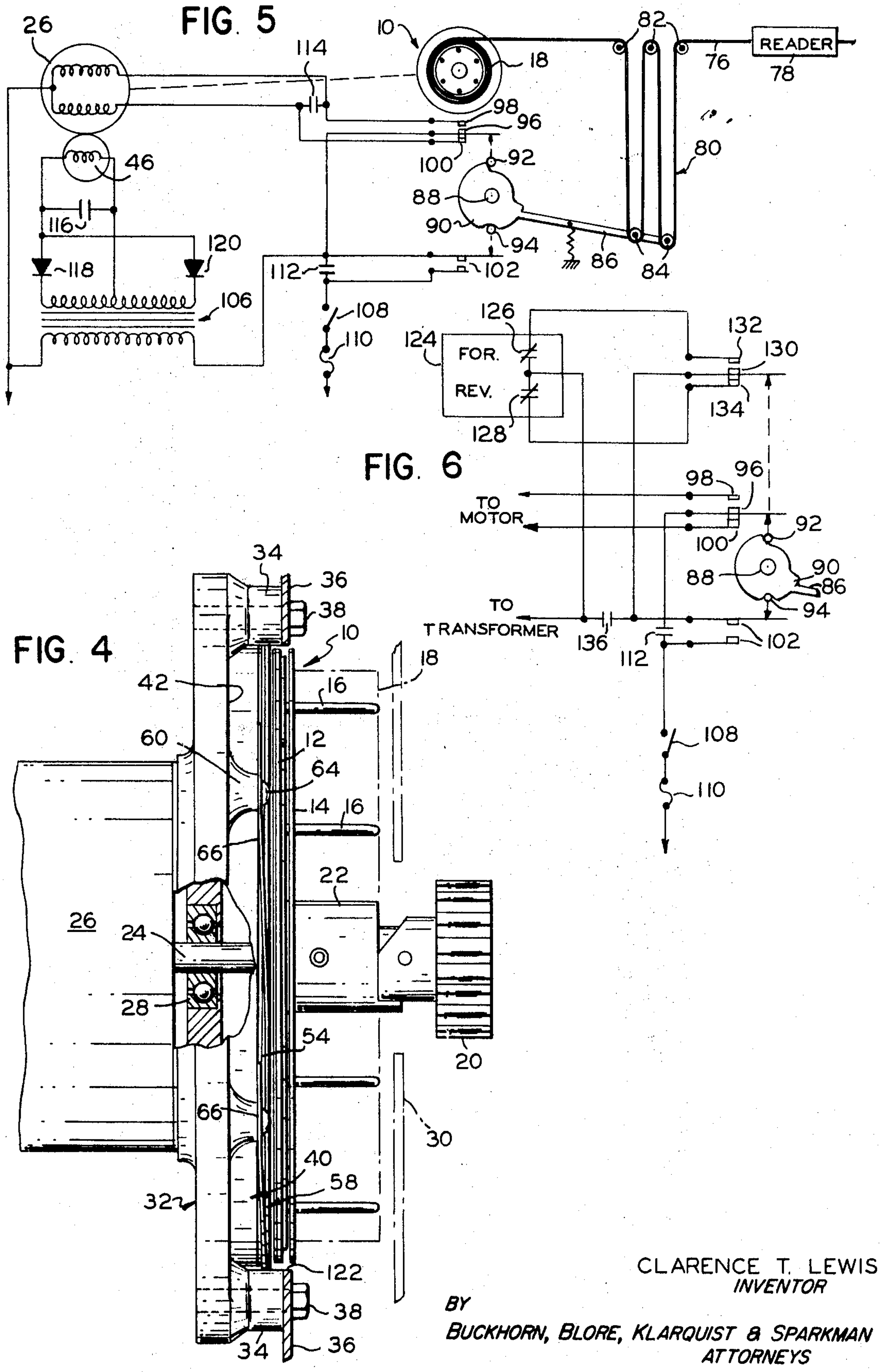
FIG. 4 is a side view, partially broken away, of a tape reel together with drive means and brake means therefor, according to the present invention.
FIG. 5 is a schematic diagram of circuitry for operating a tape reel drive motor and brake means.
FIG. 6 is a schematic diagram of another circuit for operating a tape reel drive motor and brake means according to the present invention.

A circuit for operation of the brake means and the motor according to the present invention is illustrated in FIG. 5. The tape reel 10 is suitably employed for feeding out or reeling in punched paper tape 76 as a reader 78 rapidly moves such tape for reading thereof. For example, reader 78 may rapidly propel a length of tape 76 to the right in FIG. 5 when the information contained thereon is demanded by a digital computer or the like. Alternatively, reader 78 may feed paper tape 76 in the reverse direction, i.e. to the left. The function of reel 10 is to store the paper tape and feed out or take in the tape as demands are made thereon by the reader.

The tape forms a multiplicity of tape loops 80 in passing around stationary rolls 82 and movable rolls 84 mounted on spring-biased sensing arm 86. Sensing arm 86 pivots at 88, and in so doing rotates cam 90 which operates cam followers 92 and 94. Cam follower 92 positions movable electrical contact 96 as between fixed contacts 98 and 100. If sensing arm 86 moves upward, cam follower 92 remains in the position shown such that contact 96 connects to contact 100. However, if the sensing arm 86 moves downwardly, then cam follower 92 will close contact 96 against contact 98.

Cam follower 94 operates normally open contacts 102, these contacts being opened in the "neutral" position shown for sensing arm 86. Should sensing arm 86 move either upwardly or downwardly, contacts 102 will be closed by action of cam follower 94. Contacts 98 and 100 are connected respectively to windings of motor 26. This motor is a capacitor-run, reversible motor having a capacitor 114 connected between contacts 98 and 100. The remaining end of each of the motor windings is connected to the opposite side of the A.C. line. Motor 26 is high slip with high acceleration.

One side of the primary of a transformer 106 is connected to one side of the A.C. power line, and the other side of this winding is connected in series with contacts 102, switch 108, and fuse 110 to the other side of the power line. Also, a capacitor 112 is coupled across contacts 102 to minimize contact arcing. The transformer side of contacts 102 is connected to movable contact 96.

The secondary of transformer 106 operates brake coil 46 having a capacitor 116 shunted thereacross. One side of coil 46 is connected to the center tap on the transformer secondary, while diodes 118 and 120 connect respectively from the opposite ends of the transformer secondary to the remaining terminal of the brake winding. The diode anodes are both connected to the brake coil in the embodiment illustrated. Diodes 118 and 120 thereby form a full wave rectifier for providing D.C. current to brake coil 46 when switch 108 and contacts 102 are closed. The brake coil operates at approximately 12 volts D.C., and capacitor 116 is employed for filtering purposes. D.C. operation also avoids brake vibration noise.

Considering operation of the circuit illustrated in FIG. 5, main switch 108 will be closed. When reader 78 takes a "bite" of tape 76, moving the tape rapidly to the right, the tape and loops 80 will shorten and move sensing arm 86 upwardly. Contacts 102 are closed, and as a result brake coil 46 is energized for releasing the brake. Motor 26 is also energized in a forward or clockwise direction via contacts 96 and 100 for paying out further tape. As reel 10 "catches up" with the demand for tape, sensing arm 86 returns to the neutral position shown, opening contacts 102 such that the brake becomes operative by deenergization of coil 46, while at the same time motor 26 is deenergized at the upper contacts.

If reader 78 rapidly feeds tape to the left, loops 80 will increase in length, and arm 86 will be drawn downwardly by the spring bias applied thereto. Contact 96 will first close against contact 98. Then, contacts 102 close energizing brake coil 46 for disengaging the brake, and at the same time motor 26 is provided current through contacts 96 and 98. Thus, the upper winding of motor 26 will be directly connected to the A.C. source with the lower winding being connected via capacitor 114. As a consequence, motor 26 will turn in a counterclockwise direction and take up the tape delivered by reader 78. As reel 10 "catches up," sensing arm 86 will return to the neutral position opening contacts 102 whereby the motor is deenergized and braking is restored.

The above described circuit and method of operation is found successful at moderate tape speeds, for example when the tape is withdrawn from said reel or delivered back to the reel from reader 78 at speeds up to 60 inches per second. At higher speeds, e.g. at 100 inches per second, some difficulties are sometimes experienced. Thus, if the reader 78 is feeding tape toward reel 10 at the high speed and stops suddenly, tape loops 80 will become shorter as reel 10 continues to rotate temporarily in a counterclockwise direction. Sensing arm 86 will frequently be raised above "neutral" position, and power will be applied to the motor tending to make reel 10 turn in a clockwise direction. This, of course, would have some tendency to halt rotation of reel 10. Meanwhile, however, counterclockwise motor rotation may shorten loop 80 to the vanishing point, causing an undesired direct pull on tape 76 and possible misoperation of the reader. According to the embodiment of FIG. 6, further means are applied for rapidly stopping rotation of the motor in order to maintain the presence of loops 80.

Referring to FIG. 6, the tape reel drive motor 26 is provided with a switch 124 for detecting rotation and the direction of rotation of the motor. For example, an inertial switching device capable of indicating rotation and direction of rotation may be employed. Switch 124 includes normally closed contacts 126 and 128. Contacts 126 open when the motor operates above a given slow speed in a forward or clockwise direction. This corresponds to pay out of tape from reel 10. Contacts 128 open when the motor rotates above a given slow speed in the reverse or counterclockwise direction. This corresponds to winding up of tape onto reel 10.

Additional contacts are provided which are operated by cam follower 92. When the cam 90 rotates with arm 86 in a clockwise direction, contact 130 is closed against contact 132. Otherwise, contact 130 will make connection with contact 134. For clockwise movement of cam 90, contact 130 will close against contact 132 before contacts 102 are closed by cam follower 94.

In addition to the circuitry hereinbefore described with reference to FIG. 5, the FIG. 6 circuit includes further elements in series between contacts 102 and the transformer primary. The junction between contacts 102 and contact 96 is connected to contact 130. Contacts 126 and 128 are disposed in series, with the interconnection therebetween being coupled to the transformer primary. A capacitor 136 is located between contacts 102 and the transformer primary to prevent arcing across contacts 126, 128, and 130–132–134. Contacts 126 are interposed between the aforementioned interconnection and contact 132, while contacts 128 are serially connected between the same interconnection and contact 134. In other respects, the FIG. 6 embodiment is identical to that illustrated in FIG. 5.

Considering operation of the FIG. 6 circuit, assume that reel 10 is reeling in tape from a reader. Consequently, reverse contacts 128 will be open. However, at this time contact 130 will be closed against contact 132, and hence a circuit for maintaining the brake coil in an energized condition (for disabling the brake) is completed via contacts 102, contacts 130 and 132, and contacts 126 to the transformer primary. Now, should the reader stop suddenly so that tape is no longer fed to reel 10, the length of loops 80 may decrease to the extent that cam 90 passes the "neutral" point, directing motor rotation in a clockwise direction. In accordance with the circuit of FIG. 5, the brake would be released after cam 90 passed neutral, since contacts 102 would be closed. However, in accordance with the circuit of FIG. 6, the brake shoe disc is maintained against the reel because the circuit for energizing the brake coil is now broken. Thus, as arm 86 rises, rotating cam 90 in a counterclockwise direction, contact 130 will make connection with contact 134, but contacts 128 are open as mentioned above, thereby deenergizing the brake coil and actuating the brake. Counterclockwise motor rotation is arrested more rapidly as a result, and the brake is applied until the motor has stopped, or has nearly stopped, and contacts 128 have closed, thereby releasing the brake and allowing the motor to operate briefly in a clockwise direction for returning arm 86 to neutral. As a consequence, loops 80 are maintained and a sudden pull on unlooped tape is avoided.

Operation starting with rapid clockwise reel rotation followed by a sudden stop is the reverse of that described above.

While I have shown and described a preferred embodiment of my invention, it will be apparent to those skilled in the art that many changes and modifications may be made without departing from my invention in its broader aspects.

I claim:

1. Brake means for a reel employed for winding information bearing tape, said reel including a disc-like member, wherein said disc-like member substantially defines an outer diameter of said reel, said brake means comprising:

a rotationally stationary brake shoe disc having a diameter similar to that of said disc-like member and mounted coaxially adjacent said disc-like member, said brake shoe disc being formed of magnetic material, spring means for normally urging said brake shoe disc against said disc-like member for braking the rotation of said reel, an annular electromagnet positioned in coaxial relation with said reel on the remote side of said brake shoe disc from said reel and in juxtaposition with said disc-like member near the outer edge thereof, said electromagnet having an annular groove facing said brake shoe disc and pole faces on either side of said groove to which said brake shoe disc is selectively attracted for releasing said reel, and a coil located circumferentially in said annular groove and adapted to receive current for energizing said electromagnet.

2. The brake means according to claim 1 wherein the disc-like member where it faces said brake shoe disc is provided with a brake lining material.

3. The brake means according to claim 1 wherein said brake shoe disc where it faces said annual electromagnet is provided with a cushioning material.

4. The brake means according to claim 1 wherein said spring means comprises spring tabs cut from the periphery of said brake shoe disc, and means of mounting said tabs to the outer sides of said electromagnet at a level further from said brake shoe disc than said pole faces.

5. The brake means according to claim 1 wherein said brake shoe disc is also annular in juxtaposition with said electromagnet.

6. In combination with the means of claim 5, a motor for rotating said reel, said motor having a shaft extending coaxially through said electromagnet and said brake shoe disc for mounting said reel, and means for energizing said electromagnet substantially simultaneously with energization of said motor for releasing braking of said reel at a time when said reel is rotated by said motor.

7. The apparatus of claim 6 further including a common mounting bracket for said motor and said spring tabs, said spring tabs in turn mounting said brake shoe disc, said bracket being formed of ferromagnetic material and integrally including said electromagnet.

8. The apparatus according to claim 7 wherein said bracket further includes lugs for mounting said motor, with said reel mounted on the shaft thereof, upon the face of the panel, said reel extending through an aperture in said panel.

9. In combination with the means of claim 6, sensing means for detecting travel of said tape at a location removed from said reel to control said motor for rotating said reel in a corresponding direction, and means for deenergizing said electromagnet for braking said reel when said motor rotates in a direction opposite to that directed by said sensing means.

10. The apparatus of claim 9 wherein said sensing means comprises a sensing arm engaging at least one extended loop of said tape, travel of said tape moving said sensing arm by means of changing the length of said loop of tape, and wherein said means for deenergizing said electromagnet includes means for detecting the rotational direction of said motor.

References Cited

UNITED STATES PATENTS

| | | | |
|---|---|---|---|
| 2,791,933 | 5/1957 | Crockett | 242—180X |
| 2,967,673 | 1/1961 | Fujii | 242—204 |
| 3,153,515 | 10/1964 | Scully et al. | 242—204 |
| 3,341,141 | 9/1967 | Jura et al. | 242—190 |

LEONARD D. CHRISTIAN, Primary Examiner

U.S. Cl. X.R.

242—75.44